G. W. RUHL.
DIRECTION INDICATOR.
APPLICATION FILED APR. 5, 1917.
1,340,082.
Patented May 11, 1920.
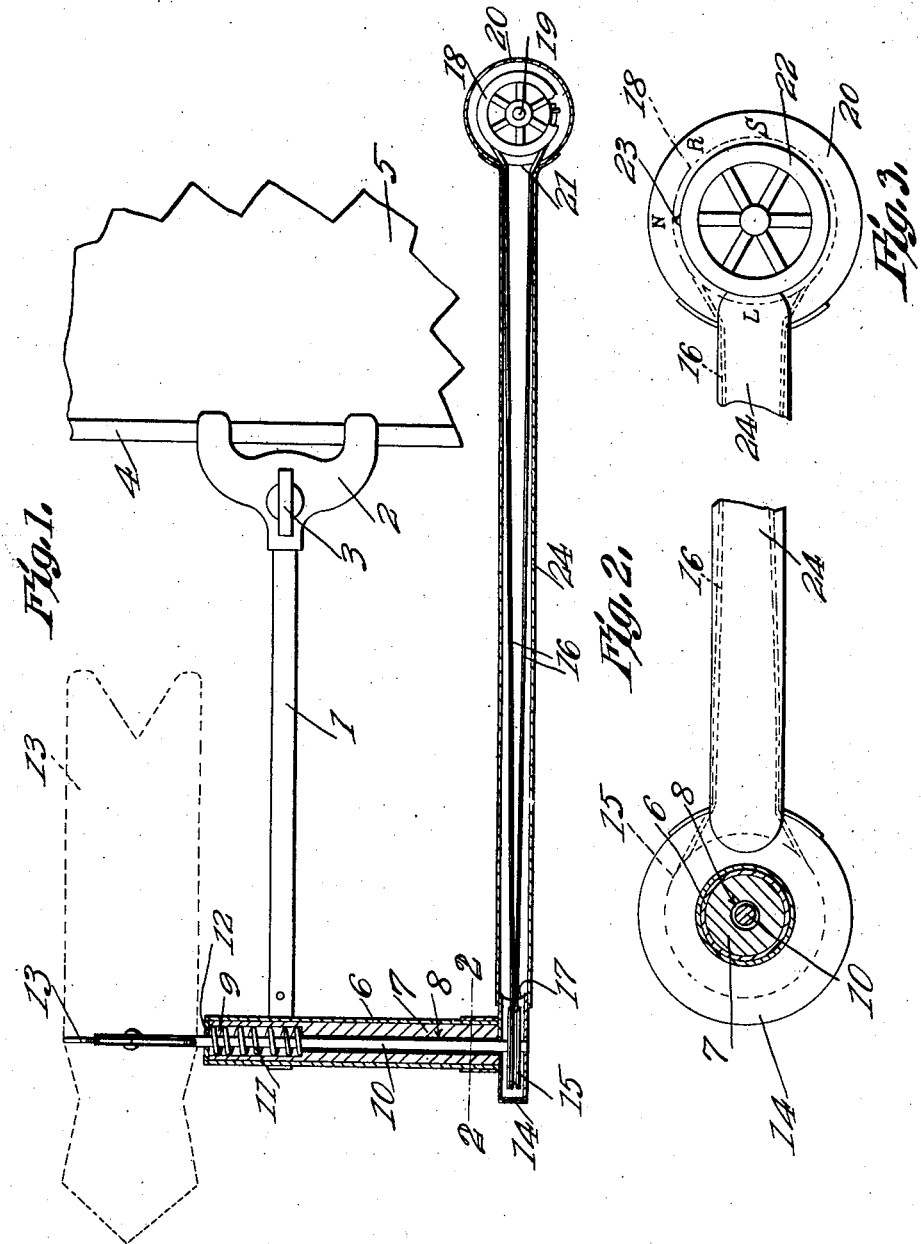
Witness
J. R. ... 
R. Parker.
Inventor
G. W. Ruhl
By C. A. Snow & Co.
Attorney

UNITED STATES PATENT OFFICE.

GEORGE WILLIAM RUHL, OF BARNES, KANSAS, ASSIGNOR OF ONE-HALF TO EMIL KILLMAN, OF BARNES, KANSAS.

DIRECTION-INDICATOR.

1,340,082.  Specification of Letters Patent.  Patented May 11, 1920.

Application filed April 5, 1917. Serial No. 159,984.

*To all whom it may concern:*

Be it known that I, GEORGE WILLIAM RUHL, a citizen of the United States, residing at Barnes, in the county of Washington and State of Kansas, have invented a new and useful Direction-Indicator, of which the following is a specification.

The subject of this invention is a direction indicator adapted for attachment to a vehicle and in which a semaphore is associated with operative mechanism therefor.

One object of the invention is to provide an indicator which may be readily attached to, or detached from a vehicle.

Another object is to provide means for compensating for the wear on the bearing parts of the semaphore shaft.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing:—

Figure 1 is a view, partly in elevation and partly in section, showing the device attached to the side bar of a wind shield frame, the semaphore being shown in full lines in its normal position, and in dotted lines in a position indicating a turn to the left.

Fig. 2 is a detail sectional view taken on the line 2—2 of Fig. 1.

Fig. 3 is an enlarged detail showing the operating wheel and its dial in elevation.

Referring to the drawings by numerals:—

A bracket arm 1, formed at one end to coöperate with a clamping member 2, which is held in clamping relation with said end by a thumb screw 3, forms the main support of the device. This supporting bracket arm may be clamped to any convenient portion of a vehicle. In the present instance, it is shown attached to the side bar 4 of the frame of a wind shield 5, such as is usually supplied at the front of an automobile.

To the other end of the bracket arm 1 is secured a tubular casing 6 in which is inserted a filler 7, preferably of wood. The purpose of the filler is to form a support for the light walls of the tubular casing and to gain lightness of structure while preserving sufficient strength. A central, longitudinal bore 8 is formed in the filler the upper end of which terminates in an enlarged bore 9. A vertically disposed shaft 10 extends through and turns in the bores 8 and 9 and is surrounded, at the portion within the bore 9, by a coiled spring 11 which is held in place within the bore 9 by a collar 12 on the shaft 10, which collar is adapted to the upper end of the tubular casing 6. A semaphore 13 is secured to the shaft 9 above the collar 12. The main purpose of the coiled spring 11 is to compensate for wear of the parts and, by retaining the parts in closed contact, prevent vibration or rattling of the shaft 10.

Housed within a casing 14, which is secured to the lower end of the casing 6, is a grooved pulley 15 which is made fast to the lower end of the shaft 10. A round belt 16 passes around the pulley 15 and extends through an opening 17 formed in the casing 14. The belt 16 extends horizontally from the pulley 15 and has its ends secured at diametrically opposite points of a wheel 18. The wheel 18 is secured to a horizontally disposed shaft 19 which is journaled in the walls of a circular casing 20, which is provided at one point with an opening 21, to permit passage therethrough of the belt 16. One end of the shaft 19 extends beyond a wall of the casing 20, and to this end is secured a hand wheel 22. A pointer 23 is provided on the hand wheel to indicate, on a dial arranged on the wall of the casing 20, the position to which the semaphore is turned.

A tubular casing 24 has one end secured to the casing 14 and surrounds the opening 17 thereof, and the other end is secured to the casing 20 and surrounds the opening 21. The casing 24 acts both as a housing for the belt 16 and as a support to retain the wheel 20 in proper operative position with respect to the grooved pulley 15.

In use, the device is clamped to the side bar of the frame of a wind shield, or any suitable portion of a vehicle. The semaphore is held extended slightly on one side of the vehicle, and the casing 24 extends horizontally along the dash board just below the wind shield, supporting the hand wheel 22 immediately in front of the operator of the vehicle. Normally the semaphore is set in the position shown in full lines in Fig. 1. When a turn is to be made to the left, the hand wheel is turned until the pointer registers with the letter L on the dial. The semaphore will then assume the position shown in dotted lines in Fig. 1. To indicate a turn to the right, the hand wheel is turned in the opposite direction until the pointer registers with the letter R of the dial. When the pointer is placed in register with the letter S on the dial, the semaphore is given a partial turn, indicating that the vehicle is about to stop.

Having described my invention, what I claim as new and desire to secure by Letters Patent, is:—

1. A direction indicator of the class described comprising a casing, a shaft vertically mounted therein, a signal carried by the upper end of the shaft and projecting above the casing, an arm secured to the casing and projecting laterally therefrom, a clamp secured in the free end of the arm for engaging the side of the wind shield frame, a housing extending from the bottom of the casing, and operating means for said signal shaft, within said housing, said means being operable from the inner end thereof.

2. A direction indicator comprising a tubular casing, a filler extending to the full length of said casing and provided with a passage therethrough and a counterbore in the upper end thereof communicating with said passage, a signal shaft rotatable in said filler, a cap on said shaft in contact with the upper end of said casing, an expansible spring encircling the shaft within the counterbore and exerting pressure against said cap and the end wall of the counterbore, said spring being free of attachment to said parts, a disk-like casing secured to the lower end of the first named casing, said first named casing forming a standard, said disk-like casing having an opening in one side, a tubular casing secured thereto at said opening, a disk-like casing secured to the outer end of the tubular casing, a grooved pulley secured to the lower end of the shaft within said first named disk-like casing, said shaft having bearing in the bottom of the casing, a pulley rotatable in the outer casing and having an operating wheel located outwardly and above the same, and an endless drive member extending around said pulleys and through the second-named tubular casing, substantially in the manner as and for the purposes specified.

In testimony that I claim the foregoing as my own, I have hereto affixed my signature in the presence of two witnesses.

GEORGE WILLIAM RUHL.

Witnesses:
 ADOLPH HÀNNI,
 A. W. SOLLER.